US009136792B2

(12) United States Patent
Tomlinson

(10) Patent No.: US 9,136,792 B2
(45) Date of Patent: Sep. 15, 2015

(54) MOUNTING SYSTEM FOR PHOTOVOLTAIC ARRAYS

(75) Inventor: Joseph Tomlinson, Park City, UT (US)

(73) Assignee: rTerra Holdings, LLC, Middletown, RI (US)

(*) Notice: Subject to any disclaimer, the term of this patent is extended or adjusted under 35 U.S.C. 154(b) by 105 days.

(21) Appl. No.: 13/602,161

(22) Filed: Sep. 2, 2012

(65) Prior Publication Data

US 2013/0056595 A1 Mar. 7, 2013

Related U.S. Application Data

(60) Provisional application No. 61/530,553, filed on Sep. 2, 2011.

(51) Int. Cl.
H01L 31/042 (2014.01)
H02S 20/10 (2014.01)
F24J 2/52 (2006.01)

(52) U.S. Cl.
CPC ............. H02S 20/00 (2013.01); H02S 20/10 (2014.12); F24J 2/5205 (2013.01); F24J 2/5232 (2013.01); Y02B 10/12 (2013.01); Y02B 10/20 (2013.01); Y02E 10/50 (2013.01)

(58) Field of Classification Search
CPC .... H01L 31/0422; F24J 2/5256; F24J 2/5232; H02S 20/10
USPC .................. 248/176.1; 52/173.3; 136/244
See application file for complete search history.

(56) References Cited

U.S. PATENT DOCUMENTS

| 4,321,745 | A | | 3/1982 | Ford |
| 5,121,583 | A | * | 6/1992 | Hirai et al. ................ 52/90.1 |
| 6,105,317 | A | * | 8/2000 | Tomiuchi et al. ........... 52/173.3 |
| 6,360,491 | B1 | * | 3/2002 | Ullman ........................ 52/22 |
| 7,307,209 | B2 | * | 12/2007 | Mapes et al. ................ 136/251 |
| 7,600,349 | B2 | * | 10/2009 | Liebendorfer .............. 52/173.3 |
| 7,694,466 | B2 | | 4/2010 | Miyamoto et al. |

(Continued)

FOREIGN PATENT DOCUMENTS

CN 202081585 U 12/2011
EP 0905795 3/1999

(Continued)

OTHER PUBLICATIONS

Brooks, A. E., Allen, N., Lonij, V. P., and Cronin, AL. D., "Evaluation of Four Geomembrane-Mounted PV Systems for Land Reclamation in Southern Arizona", University of Arizona, Department of Physics, Tucson, Arizona [Online] 2012, pp. 1-6.

(Continued)

Primary Examiner — Joshua J Michener
Assistant Examiner — Chiedu Chibogu
(74) Attorney, Agent, or Firm — Sheridan Ross P.C.

(57) ABSTRACT

A mount system for a photovoltaic (PV) panel array allows for ease of installation, flexibility of movement, and the ability to remove and redeploy the system as needed. The mounting system includes a plurality of standoff mounts which are secured to a substrate in a grid system, elongated mounting rails which are secured onto the standoff mounts in parallel, and attachment rails secured to opposing side edges of the PV panels. The attachment rails and mounting rails include interfitting mating formations which interlock to suspend the PV panels between the mounting rails and above the substrate.

11 Claims, 8 Drawing Sheets

(56) References Cited

U.S. PATENT DOCUMENTS

| | | | |
|---|---|---|---|
| 7,956,280 B2* | 6/2011 | Kobayashi | 136/251 |
| 8,039,733 B2* | 10/2011 | Kobayashi | 136/251 |
| 8,146,299 B2* | 4/2012 | Stearns et al. | 52/58 |
| 8,176,693 B2* | 5/2012 | Abbott et al. | 52/173.3 |
| 8,256,170 B2* | 9/2012 | Plaisted et al. | 52/173.3 |
| 8,448,405 B2* | 5/2013 | Schaefer et al. | 52/710 |
| 8,661,765 B2* | 3/2014 | Schaefer et al. | 52/655.1 |
| 2006/0174931 A1* | 8/2006 | Mapes et al. | 136/251 |
| 2007/0295391 A1* | 12/2007 | Lenox et al. | 136/251 |
| 2008/0265112 A1* | 10/2008 | Pascual et al. | 248/176.1 |
| 2009/0250580 A1 | 10/2009 | Strizki | |
| 2009/0255573 A1 | 10/2009 | Taylor | |
| 2010/0192505 A1 | 8/2010 | Schaefer et al. | |
| 2010/0193012 A1 | 8/2010 | Klammer et al. | |
| 2010/0236183 A1 | 9/2010 | Cusson et al. | |
| 2010/0278592 A1 | 11/2010 | Walker | |
| 2010/0294343 A1* | 11/2010 | Wexler et al. | 136/251 |
| 2011/0047903 A1 | 3/2011 | Kobayashi | |
| 2011/0162779 A1 | 7/2011 | Stanley | |
| 2011/0214366 A1* | 9/2011 | Haddock et al. | 52/173.3 |
| 2011/0248137 A1 | 10/2011 | Barba | |
| 2011/0308566 A1 | 12/2011 | Johnson | |
| 2012/0045286 A1 | 2/2012 | Oliveira | |
| 2012/0085394 A1 | 4/2012 | McPheeters et al. | |
| 2012/0110931 A1 | 5/2012 | Eiffert et al. | |
| 2012/0192926 A1 | 8/2012 | Kambara et al. | |
| 2012/0233958 A1* | 9/2012 | Stearns | 52/708 |

FOREIGN PATENT DOCUMENTS

| | | | |
|---|---|---|---|
| FR | 2957953 A | | 9/2011 |
| WO | WO 2007093421 A2 | * | 8/2007 |
| WO | WO 2010082653 A1 | * | 7/2010 |

OTHER PUBLICATIONS

Sampson, G., "Solar Power Installations on Closed Landfills: Technical and Regulatory Considerations", U.S. Environmental Protection Agency [Online] Sep. 2009, pp. 1-24.

Extended European Search Report for European Patent Application No. 12828760.4, mailed Apr. 29, 2015, 8 pages.

* cited by examiner

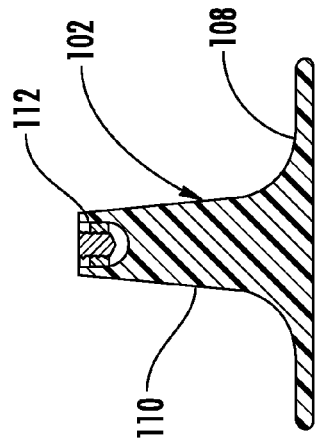
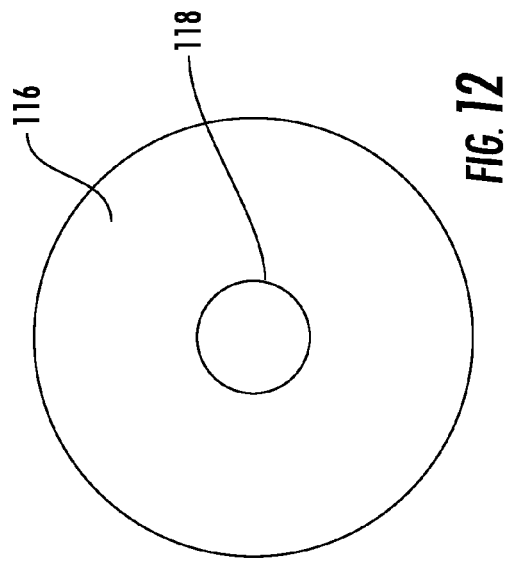
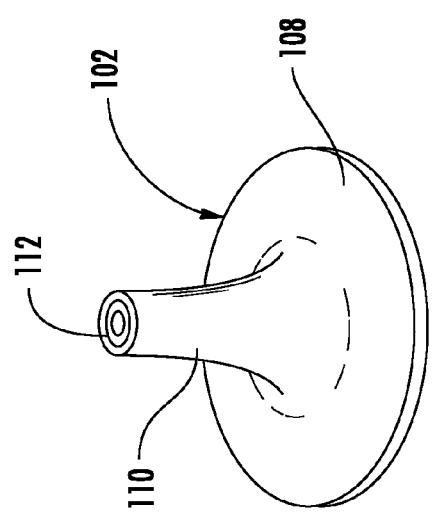
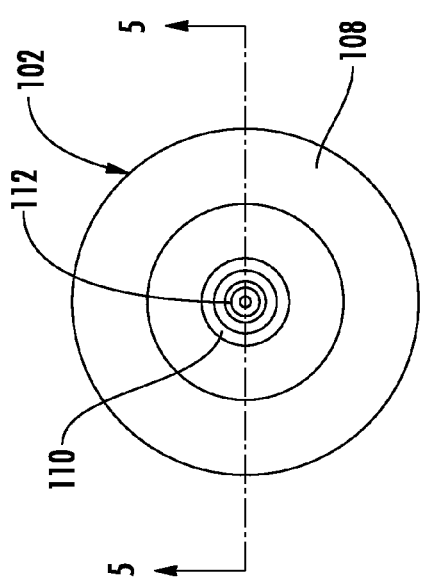

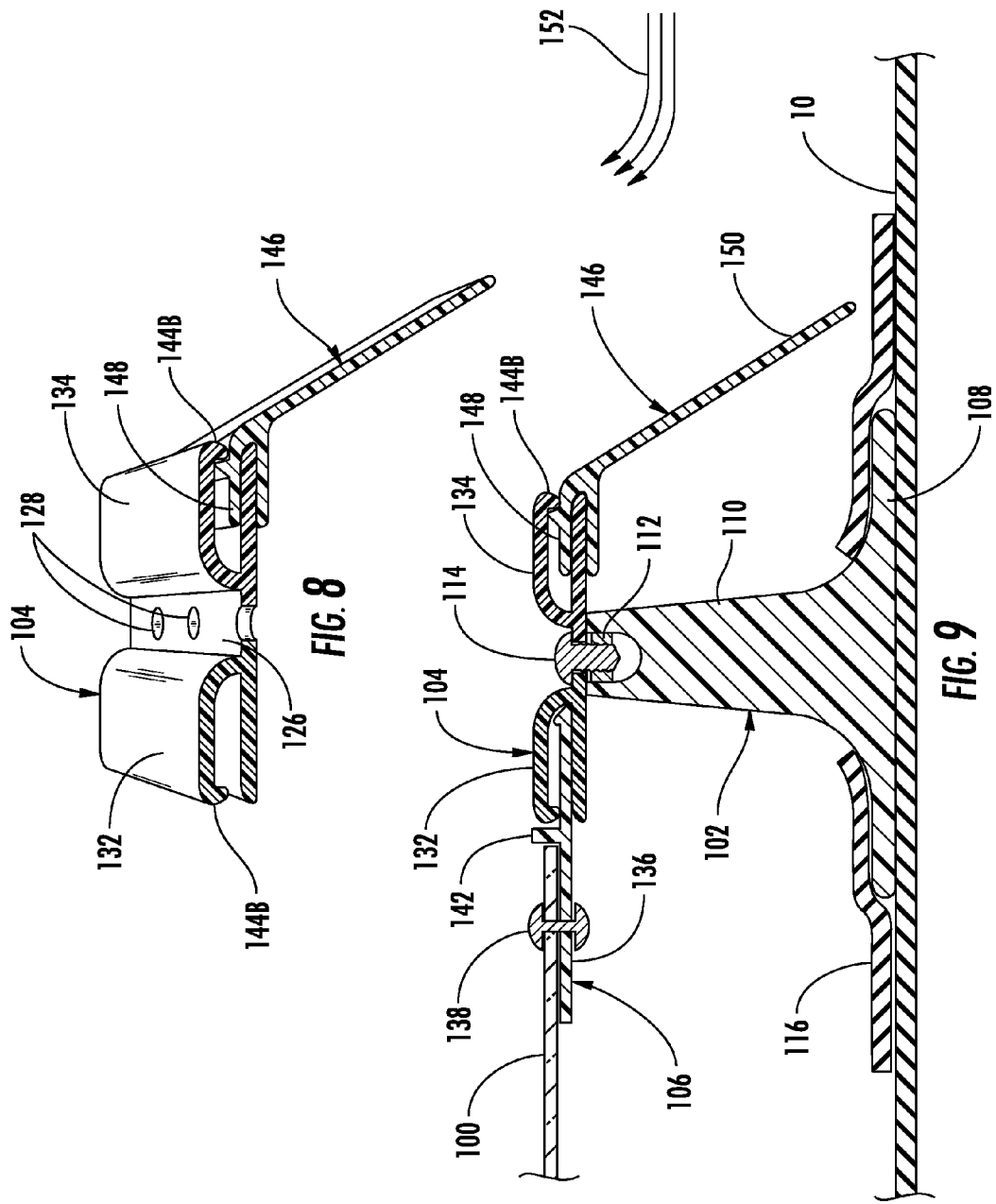

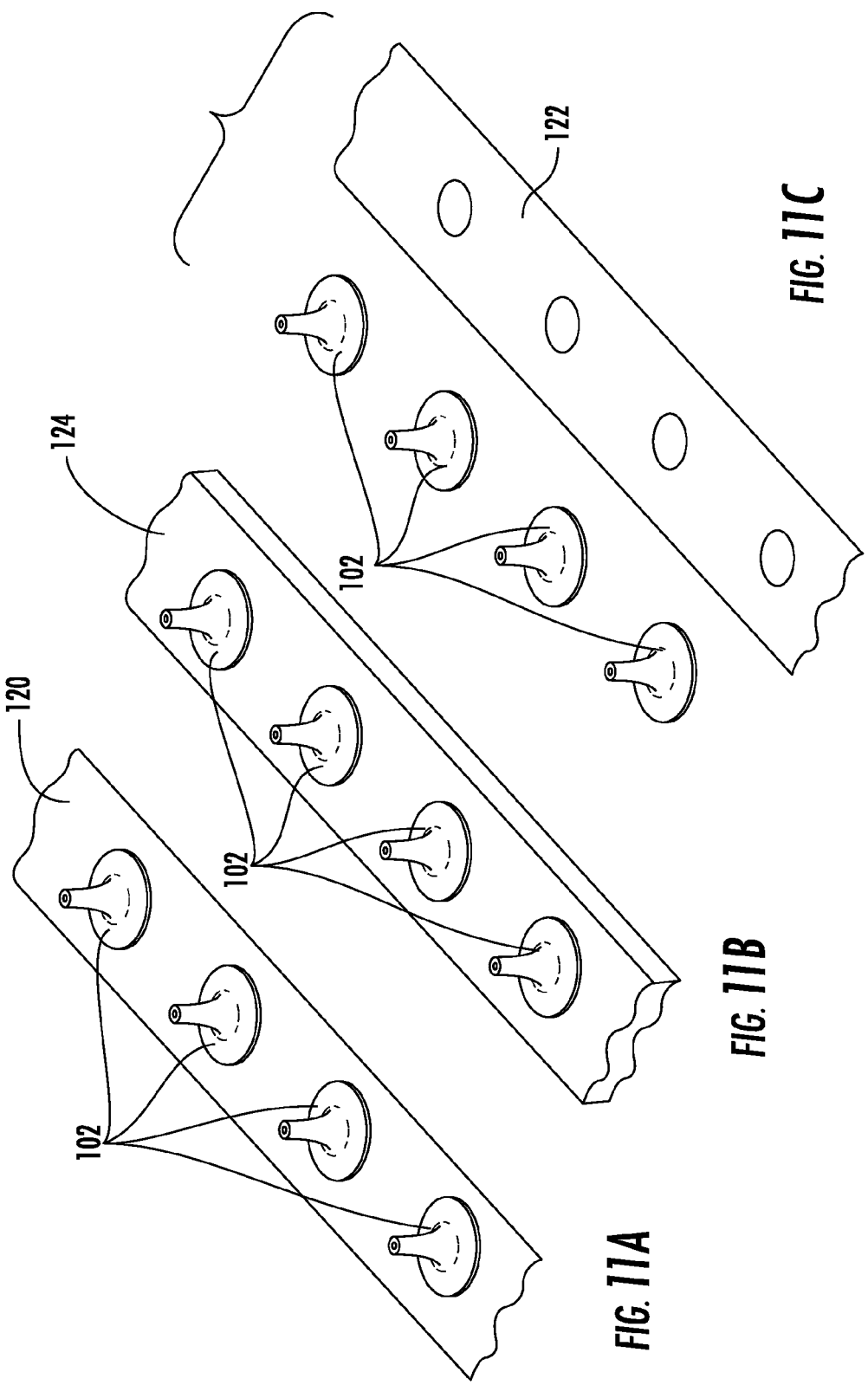

__US 9,136,792 B2__

MOUNTING SYSTEM FOR PHOTOVOLTAIC ARRAYS

CROSS-REFERENCE TO RELATED APPLICATIONS

This application claims the benefit of U.S. Provisional Application No. 61/530,553, filed Sep. 2, 2011, the entire contents of which is incorporated herein by reference.

BACKGROUND

The present invention relates to photovoltaic (PV) arrays, and more particularly to a mounting system for deploying commercial-scale solar panel arrays on geomembrane applications including roofing, reservoir covers, and exposed geomembrane covers on landfills and brownfields.

The improving economics of deploying solar arrays is making it attractive for facility owners and/or operators of assets such as rooftops, reservoirs, landfills and brownfields to deploy commercial-scale photovoltaic (PV) solar panel systems on these assets. In landfill and brownfield applications, deploying solar arrays directly to exposed geomembrane caps (EGC's) provides additional savings due to the elimination of costs associated with installation and maintenance of a two (2) foot vegetative layer required on traditional landfills. Referring to FIG. 1, a conventional grass-topped landfill cover system is shown on the right. The geomembrane cap is indicated at 10. Beneath the geomebrane 10 is waste, an intermediate cover layer and a final grading layer. Grass-topped cover systems require additional layers of drainage media, support soil, top soil, and grass on top of the geomembrane 10. Maintenance of the grass on top is a continuing expense.

On the left of FIG. 1, is an EGC system including a flexible solar panel 12 adhered directly to the surface of the geomembrane 10. The deployment of solar covers such as these require geomembrane materials that can remain exposed to the elements for years and serve as a substrate for adhering flexible photovoltaic panels. In these cover systems, the exposed geomembrane is anchored directly into the landfill and the solar panels are adhered directly to the surface of the membrane. It can be appreciated from the side-by-side figures that the elimination of the grass, top soil and vegetative soil layers will significantly increase the amount of waste that can be accumulated for closing the landfill. Conventional solar arrays using rigid glass-encapsulated panels on metal frames with concrete bases, are less desirable because of the weight of these systems on the landfills. The weight and requisite rigidity of conventional array systems combined with the differential settlement of the underlying waste, causes movement of the arrays which can cause breakage of panels. Over the course of a 20 year deployment, the waste material beneath the cover will settle significantly and cause movement of both the membrane and the photovoltaic panels.

Accordingly, the prior art methods of deploying solar panels on exposed membranes have focused on using flexible panels (See FIGS. 1 and 2) and directly adhering the flexible panels 12 to the surface of the geomembrane 10 using adhesive backing. The flexible geomembrane 10 and flexible panels 12 were thought to be better suited to provide for settling of the waste material over time. Flexibility and movement of the panels is critical to long-term deployment.

Initial attempts at adhering the panels directly to the membrane have had some success. There are several deployed systems that are currently in operation across the country. However, there are also obvious drawbacks to adhering the panels directly to the membrane. A major drawback that has been encountered is maintenance of the panels and geomembranes, and repair or replacement of panels should they be defective or become damaged. While the panels are engineered to withstand the elements, there is still significant risk that the panels will become damaged over a lengthy period of time and will need to be replaced. Even though the panels are flexible, settlement of the waste material results in movement of the membrane and places tremendous stress on the adhered panels causing failures of the adhesive and requiring re-adhering of the panels or panel replacement. In addition, there are known issues with the adhered panels tearing the membranes due to thermal expansion where the adhesive constrains movement of the geomembrane. The coefficient of thermal expansion of the panels is different than that of the membrane. At both high and low temperatures, expansion or contraction of the panels relative to the membrane causes shearing stress on the adhesive layer and can result in failure of the panel, geomembrane and/or adhesive layer.

Another drawback is the inability to redeploy the solar array in the event the facility should require its removal for any reason. This is not possible when the panels are adhered directly to the membrane. For example, certain landfill operators plan and develop their facilities in stages that require shorter term deployment than the economics of a permanent adhesive attachment system can provide. A solar array that can be easily removed and redeployed would allow operators to attach to an EGC on a short term basis, and then remove and redeploy the array at a different location. This is not feasible when the panels are adhered directly to the membrane.

SUMMARY

Accordingly, there is believed to be a need in the industry for a mounting system that will allow movement of the panels relative to the membrane if needed, to reduce failures and to facilitate replacement.

The present invention provides a unique and novel, low-cost mounting system which will allow for ease of installation, flexibility of movement, and the ability to remove and redeploy the system as needed. The mount system in accordance with the teachings of the present invention generally comprises a plurality of standoff mounts which are secured to a substrate (geomembrane) in a parallel grid system, elongated mounting rails (female tracks) which are secured onto the standoff mounts in parallel, and attachment rails (male track inserts) which are either secured to opposing side edges of the PV panel, incorporated into the PV panels or incorporated into a supporting carrier for the PV panel. The male track inserts are slidably received into mounting channels on opposing side edges of the female tracks to suspend the solar panels between the tracks and above the substrate (geomembrane). The shapes of the mounting rails and attachment rails can vary extensively and are determined by the requirements of the specific array.

The standoff mounts include a base portion, and a neck portion extending upwardly from the base portion and a fastener received in the neck portion.

The standoff mounts can be secured to the membrane using a plurality of different attachment methods including, but not limited to adhesive bonding, ultrasonic welding, or annular bonding rings.

The base portions of the standoff mounts can also be bonded to a tape carrier with a predetermined spacing so that the standoff mounts can be quickly and easily installed in parallel strips onto the membrane. The tape carrier material is preferably is preferably the same as or similar to the membrane so that the tape carrier can be easily bonded to the membrane. Alternatively, a bonding tape can be provided with a plurality of holes formed at predetermined spacing.

The standoff mounts can also be bonded to a more rigid carrier strapping which can be used in other mounting configurations where the strapping can be secured to an underlying surface, such as a building roof or a vehicle roof with fasteners.

The mounting rail (female track) includes an elongated spine having a plurality of holes and/or elongated slots spaced longitudinally along the centerline. In use, the standoff mounts are spaced to match the spacing of the holes/slots in the track. When installed, the holes/slots align with the standoff mounts and fasteners are inserted through the holes/slots into the top of the neck portion. The elongated slots provide for sliding movement of the mounting rail relative to the standoff mounts. In the preferred embodiment, the opposing side edges of the attachment rail are provided with symmetrically opposed mounting channels that receive the complementary attachment rails (male track inserts). The attachment rails having an inner land portion onto which the side edge portion of the PV panel is seated. The PV panels are secured to the track inserts with rivets or other fasteners or bonded with an adhesive. The attachment rails further have an outer retaining tab which is received into the mounting channel in the mounting rail. The attachment rails and mounting rails include interfitting retaining formations to ensure that the attachment rails remains captured within the mounting channels in the mounting rails.

The mounting system further comprises wind shields which are utilized on the outer edges of a panel array. The wind shields have a retaining tab portion which is received into the mounting channel in the mounting rail and a shield portion which extends outwardly and downwardly to redirect air flow up and over the PV panels.

The mounting system may still further comprises a separate wire management mounting rail which includes the opposed mounting channels and further includes a J-shaped wire management channel extending downwardly from one side of the rail. Wiring is received within the hook portion of the channel.

Accordingly, among the objects of the instant invention is the provision of a PV panel mounting system that is inexpensive.

Another object of the invention is to provide a PV panel mounting system that is easy to install.

Yet another object of the invention is to provide a mounting system that will allow the PV panels to be easily reconfigured, removed or replaced when needed.

Still another object of the invention is to provide a mounting system that will allow relative movement of the PV panels and the membrane thus reducing the likelihood of damage to both the PV panels and the membrane.

Other objects, features and advantages of the invention shall become apparent as the description thereof proceeds when considered in connection with the accompanying illustrative drawings.

BRIEF DESCRIPTION OF THE DRAWING FIGURES

In the drawings which illustrate the best mode presently contemplated for carrying out the present invention:

FIG. 3 is a perspective view of a standoff mount constructed in accordance with the teachings of the present invention;

FIG. 4 is a top view thereof;

FIG. 5 is a cross-sectional view thereof taken along line 5-5 of FIG. 4;

FIG. 8 is a cross-sectional end view of a female mounting rail and a wind shield;

FIG. 9 is a cross-sectional view of the mounting system including the wind shield attached to a geomembrane;

FIG. 11A is a perspective view of a plurality of standoff mounts attached to a carrier tape;

FIG. 11B is a perspective view of a plurality of standoff mounts attached to a carrier strapping;

FIG. 11C is a perspective view of an attachment system including plurality of standoff mounts and a bonding tape including a plurality of spaced openings; and FIG. 12 is a top view of an annular bonding ring in accordance with the invention.

DETAILED DESCRIPTION OF THE PREFERRED EMBODIMENT

Figure 1:
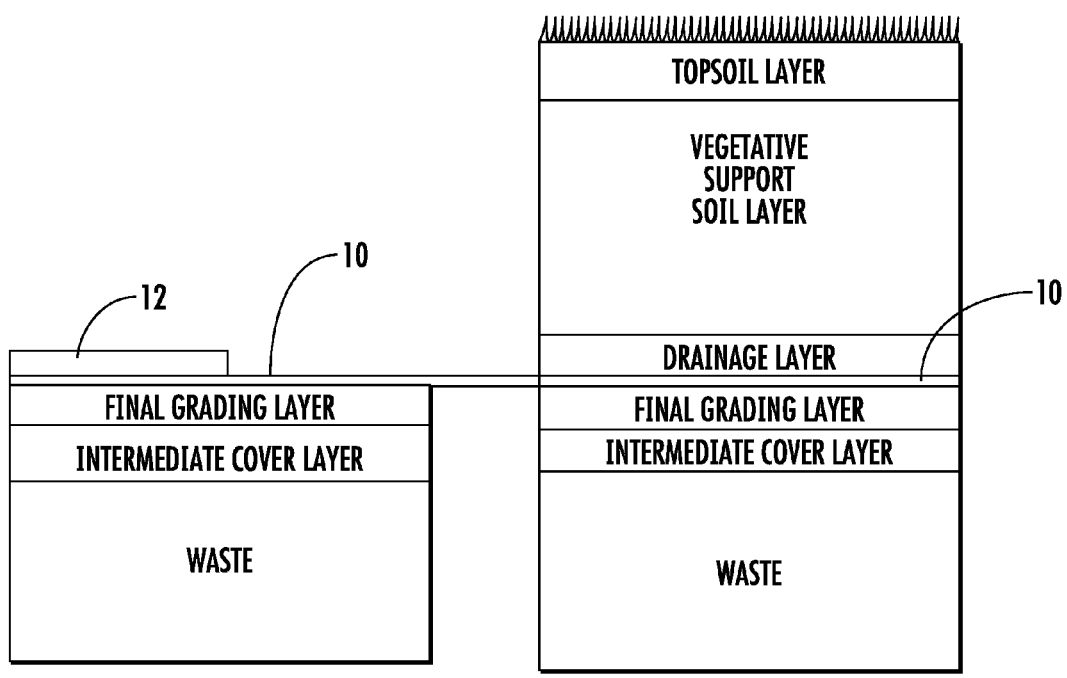
FIG. 1 is an illustration of two prior art landfill cover systems.
Figure 2:
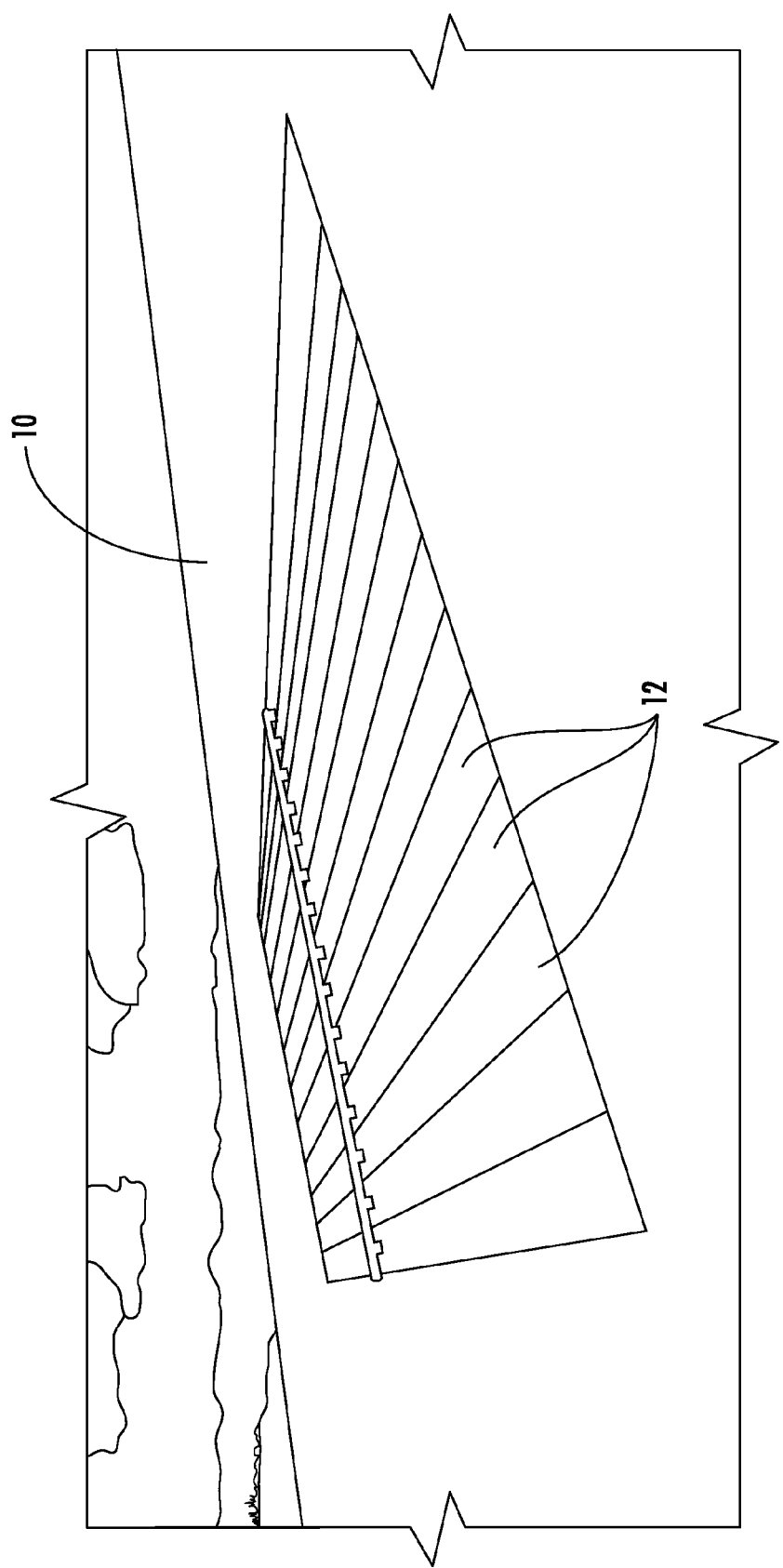
FIG. 2 is an image of a prior art exposed geomembrane cover system having flexible laminate solar panels adhered directly to the surface of the membrane.

The present invention provides a unique and novel, low-cost PV array mount system which will allow for ease of installation, flexibility of movement, and the ability to remove and redeploy the system as needed.

Before proceeding with the description, it is to be understood that the mount system herein is capable of being used with all types of photovoltaic (PV) panels 100, including flexible PV panels, as well as rigid PV panels, regardless of the length or width of the panels. The system has the flexibility to be deployed in virtually any configuration. It is also noted that the electrical systems that accompany the PV panels 100 are generally well known in the art, and will not be described in detail herein, albeit there will be mention of the mount system accommodating the required wiring of the panels.

Referring to FIGS. 3-12, the mount system in accordance with the teachings of the present invention generally comprises a plurality of standoff mounts 102 (FIGS. 3-5) which are secured to a substrate 10 (i.e. geomembrane) in a parallel grid system, elongated mounting rails 104 (FIG. 6) which are secured to the standoff mounts 102 in parallel, and attachment rails 106 secured to opposing side edges of the PV panels 100. The terms mounting rails and attachment rails are intended to define the relative placement of the rails in the system and it should be understood that these rails could be male or female depending on the application. While the exemplary embodiment illustrated herein is a female track and a male track insert, the disclosure should not be limited to only that arrangement. The shapes of the mounting rails and attachment rails can vary extensively and are determined by the requirements of the specific array. In the exemplary embodiment, the attachment rails (male track inserts) 106 are slidably received into mounting channels in opposing side edges of the parallel mounting rails (female tracks) 104 to suspend the solar panels 100 between the mounting rails 104 and above the substrate 10 (See FIG. 7).

For purposes of illustration and description, the preferred embodiments herein will be described in connection with mounting to an elastomeric membrane 10, such as a geomembrane, covering a brownfield or landfill. However, it should be appreciated that the mount system can also be deployed on other membrane covered substrates, such as the roofs of buildings or vehicles. In addition, other mounting options will be described for non-membrane covered substrates.

Referring back to FIGS. 3-5, the standoff mounts 102 include a base portion 108, a neck portion 110 extending upwardly from the base portion 108 and a fastener 112/114 received in the neck portion. In the exemplary embodiment as illustrated, a threaded cap nut 112 is inserted or molded into the top of the neck portion 110 for receiving a threaded fastener 114. Alternatively, the threaded fastener 114 could be inserted or molded into the top of the neck portion 110 and the cap nut 112 received onto the fastener. In addition, a variety of additional types of fasteners 112/114 are also possible within the scope of the disclosure. Even further still, it is contemplated that fastener elements may be directly incorporated into the mounting rails 104 for direct attachment of the mounting rails 104 to the standoff mounts 102.

The standoff mounts 102 can be manufactured in a variety of shapes as dictated by the attachment application and can be made from rigid or elastomeric materials, also as dictated by the attachment application. Where an elastomeric material is used for the standoff mounts 102 it allows the neck portions 110 thereof to flex under stress and provides a fair amount of flexibility of movement while maintaining a consistent grid array. The preferred shape as illustrated is a cone with a large bottom surface to provide structural stability and provide a securing platform.

Figure 7:
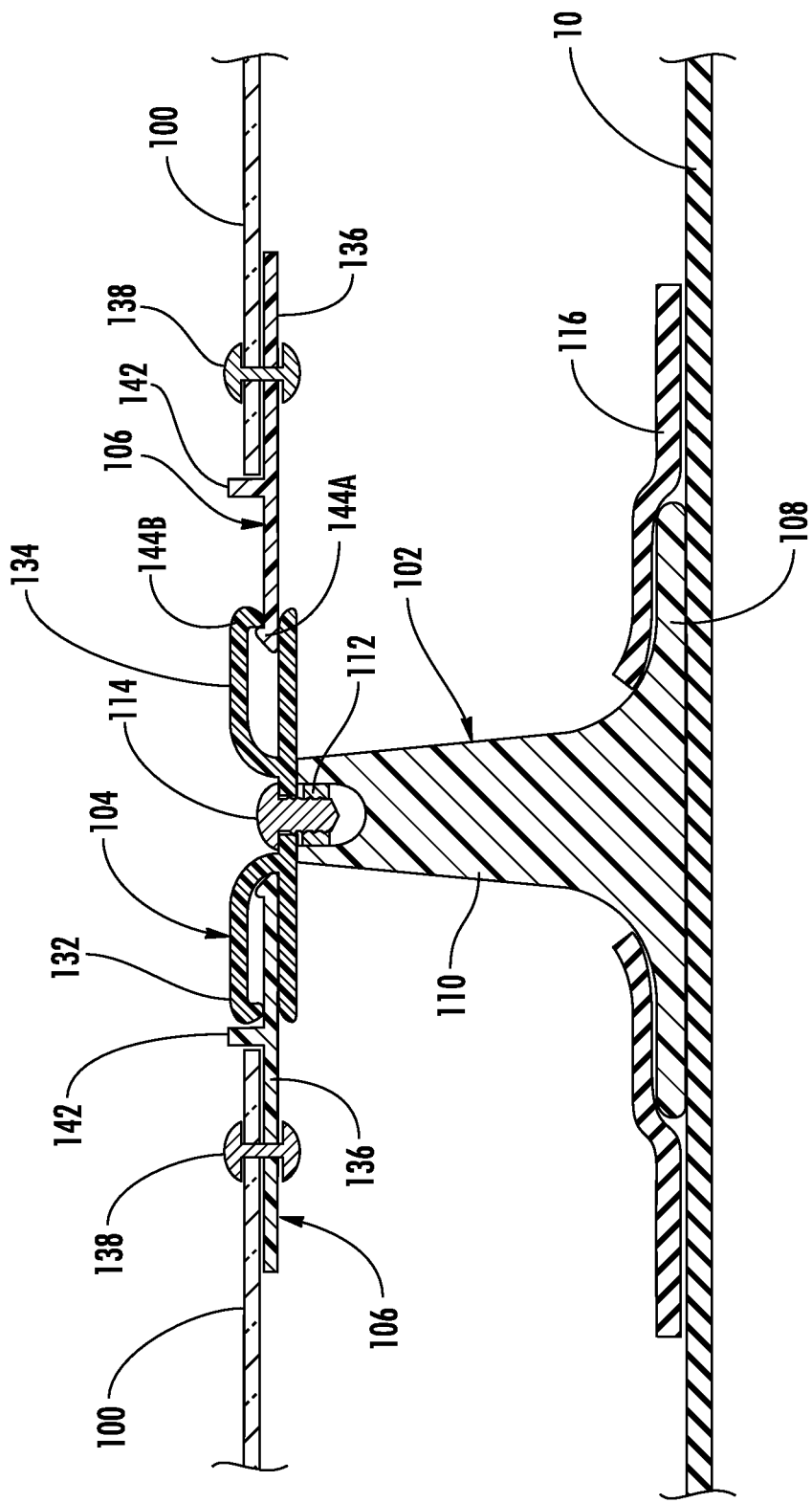
FIG. 7 is a cross-sectional view of the complete mounting system attached to a geomembrane.

Referring to FIGS. 7 and 12, the standoff mounts 102 can be secured to the membrane using a plurality of different attachment methods including, but not limited to adhesive bonding, ultrasonic welding, or annular bonding rings. In the exemplary embodiment as illustrated, the standoff mounts 102 are secured to the membrane 10 using an annular bonding ring 116 having a central opening 118. The bonding ring 116 has a diameter greater than the base portion 108 and is made of a material that is the same as or similar to the membrane material so that the bonding ring 116 can be bonded to the membrane 10. For example, the bonding ring material could comprise an engineered membrane of TPO, PP, PE, EPDM or other suitable materials that are capable of being bonded to the underlying membrane.

In use, the bonding ring 116 is received over the neck portion 110 of the standoff mount 102 and is bonded to the membrane 100 using conventional membrane bonding materials or methods, thereby trapping the base portion 108 and holding it in place (see FIG. 7).

Referring to FIG. 11A, the base portions 108 of the standoff mounts 102 can also be bonded to a tape carrier 120 with a predetermined spacing so that the standoff mounts 102 can be quickly and easily installed in parallel strips onto the membrane 10. The tape carrier 120 is preferably made from the same material or similar material to the membrane 10 so that the tape carrier 120 can be easily bonded to the membrane 10. Alternatively, a tape strip 122 can be provided with a plurality of holes formed at predetermined spacing (See FIG. 11C) wherein the standoff mounts 102 are inserted through the holes and the base portions 108 thereof held beneath the tape strip 122. The tape strip 122 is also preferably made from the same material or similar material to the membrane 10 so that the tape strip 122 can be easily bonded to the membrane 10.

Still further, the standoff mounts 102 can also be bonded to a more rigid carrier strapping 124 (FIG. 11B) which can be used in other mounting configurations where the strapping 124 can be secured to any rigid underlying substrate, such as a building roof, concrete slab, or a vehicle roof with fasteners (not shown).

Figure 6:
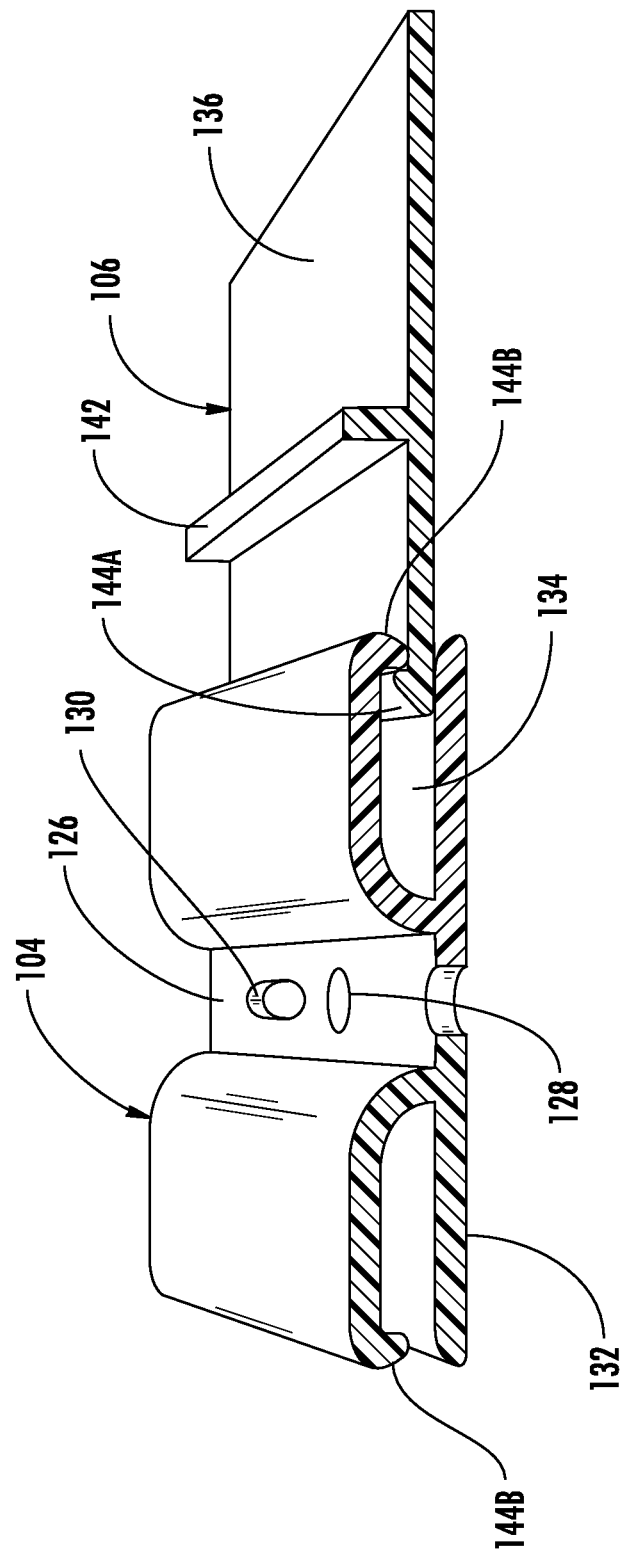
FIG. 6 is a cross-sectional end view of a female mounting rail and male attachment rail constructed in accordance with the teachings of the present invention.

Referring now to FIGS. 6 and 7, the mounting rail 104 includes an elongated spine 126 having a plurality of holes 128 and/or elongated slots 130 paced longitudinally along the centerline. In use, the standoff mounts 102 are spaced to match the spacing of the holes/slots in the mounting rail 104. When installed, the holes/slots align with the standoff mounts 102 and fasteners 114 (FIG. 7) are inserted through the holes/slots into the cap nuts 112 in the tops of the neck portions 110. The elongated slots 130 provide for longitudinal sliding movement of the tracks 104 relative to the standoff mounts 102. In another alternative (not shown) it is contemplated that the insert of the standoff mount 102 may include a swivel arm (not shown) that would rotate relative to the neck portion 110 to provide further range of motion if needed. At least one side of the mounting rail 104 is provided with a mounting channel for receiving the attachment rail 106. In the exemplary embodiment, the opposing side edges of the mounting rail 104 are provided with symmetrically opposed mounting channels 132, 134 that receive the complementary attachment rails 106.

The attachment rail 106 generally comprises an elongated strip having an inner land portion 136 onto which the side edge portion of the PV panel 100 is seated. The PV panels 100 are secured to the land portions 136 of the attachment rails 106 with rivets 138 or other fasteners or bonded with an adhesive. Alternatively, the attachment rails 106 can be integrated into the construction of the PV panels, or can be integrated into a support carrier (not shown) for the PV panel 100. The attachment rails 106 further include an outer retaining tab portion 140 which is received into the mounting channel 132,134 in the mounting rail 104. Separating the land portion 136 from the tab portion 140 is a raised shoulder 142 which facilitates alignment of the attachment rail 106 with the panel 100 and the mounting rail 104. The attachment rail 106 and mounting channels 132, 134 include interfitting locking formations (hooks) 144A,144B to ensure that the attachment rail 106 remains captured within the mounting channels 132, 134.

The mounting rail 104 and attachment rail 106 are made from polymeric materials, metal or both and include a low friction covering or additive allowing for free movement of the attachment rail 106 relative to the mounting rail 104. The depth of the channel 132,134 is variable depending on the desired ability of the attachment rail 106 to slide freely inward and outward from the centerline of the mounting rail 104. The attachment rail 106 is also able to slide longitudinally along the length of the channel 132,134. The height of the channel 132,134 is also variable and should be loose enough to allow for movement but also tight enough to ensure that the attachment rail 106 remains captured within the channel 132,134. The top wall of the channel 132,134 should be thin enough to allow the attachment rail 106 to be snapped into place (some degree of flex) but thick enough to prevent breaking during installation. It is also noted that the shape of the retaining "tooth" or "hook" 144 should not be limited by the attached illustrations. Other shapes and configurations of interfitting parts are also within the scope of the invention. Even further still, it is contemplated that the retaining "hook" 144 may be machined directly into the side edge of the PV panel eliminating the need for the attachment rail 106 altogether.

Turning to FIG. 7, an end view of the system is shown as it may be typically deployed on a landfill geomembrane 10. The standoff mounts 102 are spaced as required and secured to the geomembrane 10 with bonding rings 116. Thereafter, the mounting rails 104 are secured to the standoff mounts 102 in parallel. The holes/slots in the mounting rails 104 are aligned with the standoff mounts 102 and the fasteners 114 are inserted through the holes/slots and secured to the standoff mounts 102. As seen in FIG. 7, the mounting rails 104 are elevated above the membrane 10. The attachment rails 106 are attached to the PV panels 100 in the factory or at a staging site. The PV panels 100 are then snapped into the mounting channels 132,134 of the parallel rails 104 to hold the PV panels 100 in position. Elevating the PV array above the membrane 10 separates movement of membrane 10, due to whatever reason, i.e. expansion, contraction shifting, from the array. The standoff mounts 102 buffer any resulting movement. Elevating the PV array also allows air to flow freely beneath the array serving to keep the panels 100 and the underlying membrane 10 cooler.

To reduce wind stresses on the system, an L-shaped wind shield 146 (See FIGS. 8 and 9) is provided and assembled with the outermost mounting rail 104 of the array. In the exemplary embodiment, the wind shields 146 having a retaining tab portion 148 which is received into the outer mounting channel 134 in the mounting rail 104 and a shield portion 150 which extends outwardly and downwardly to redirect air flow 152 up and over the array. The wind shield 146 could also be molded directly into an alternate design of the track (not shown) that would only be used as an outside edge.

Wiring (not shown) between adjacent panels 100 and wiring to a control system (not shown) can be fed beneath the elevated panels 100 or can be secured in conduits (now shown) that snap together with the mounting rails 104.

Figure 10:
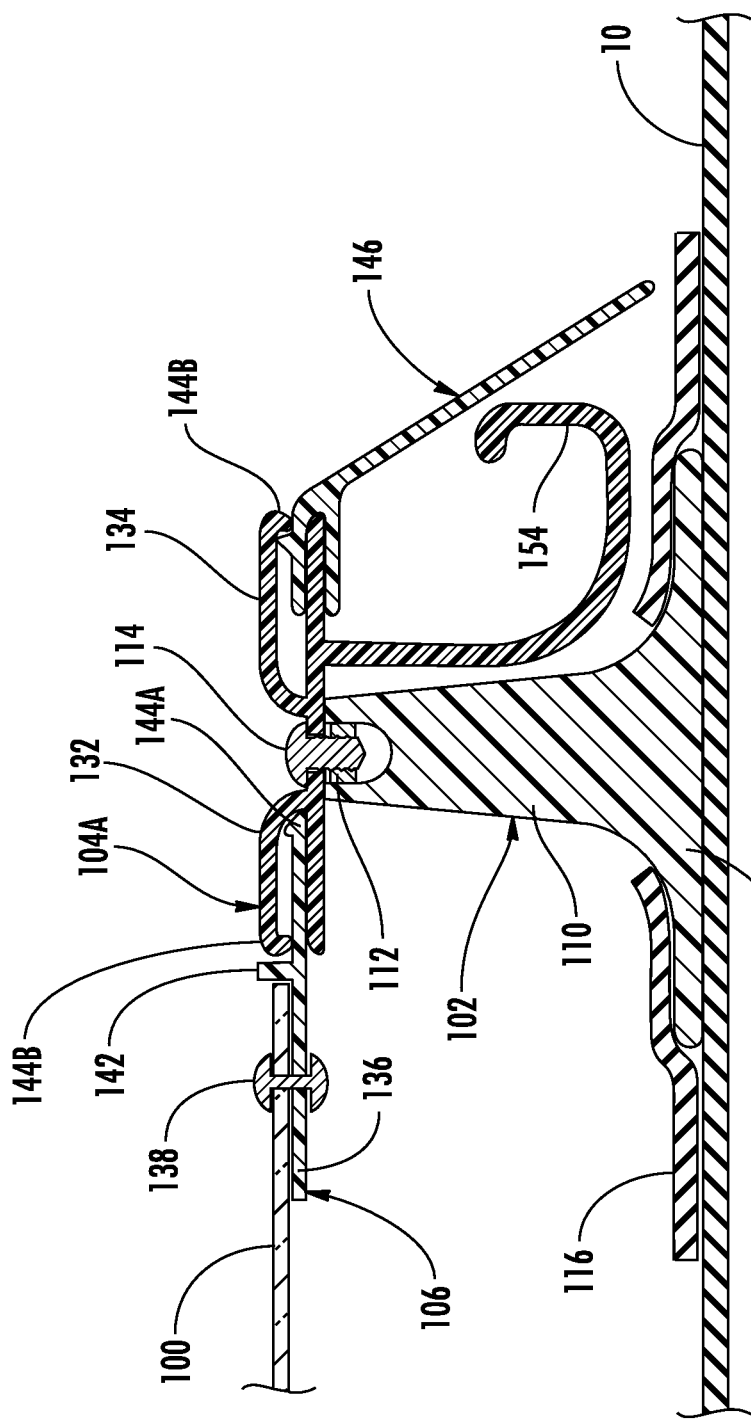
FIG. 10 is a is a cross-sectional view of the mounting system including the wire management rail and a wind shield attached to a geomembrane.

As illustrated in FIG. 10, the mount system may still further include a separate wire management rail 104A which includes the opposed mounting channels 132,134 and further includes a J-shaped wire management channel 154 extending downwardly from one side of the mounting rail 104. Wiring may be received within the hook portion of the J-shaped channel 154.

It is noted that the illustrated embodiments represent only two adjacent rows of panels 100 and tracks 104, but it is to be understood that the system can be expanded to implement an indefinite number of rows within the space of the membrane 10 or other substrate.

In the event of failure of or damage to a panel 100, it is very simple to remove a single panel 100 from the system by simply snapping the insert 106 out of the track 104, disconnecting the wiring and then replacing the damaged panel 100 with another new panel.

Accordingly, it can be seen that the present invention provides a mounting system for a PV array that is inexpensive, that is easy to install, that will allow relative movement of the panels and the membrane thus reducing damage to both the PV panels and the membrane, and that will allow the PV panels to be easily reconfigured, removed or replaced when needed.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claim.

What is claimed is:

1. A mount system for a photovoltaic panel comprising:
a plurality of one-piece standoff mounts each having a base portion securable to a substrate in a linear array at a predetermined spacing;
a mounting rail having a central spine and a plurality of openings arranged longitudinally along said central spine at a predetermined spacing matching said spacing of said one-piece standoff mounts, said mounting rail being supported on said one-piece standoff mounts above said substrate, said mounting rail being secured to said plurality of one-piece standoff mounts; and
an attachment rail having an inner land portion on which an edge portion of a PV panel is secured and further having an outer retaining tab portion,
said mounting rail and said outer retaining tab portion of said attachment rail including interfitting locking formations which are removably received and secured together whereby said PV panel is removably secured to said mounting rail,
wherein said one-piece standoff mounts comprise elastomeric materials, and at least one of said mounting rails and said attachment rails comprise polymeric materials.

2. The mount system of claim 1 wherein
said mounting rail comprising a female track having opposed outwardly facing mounting channels on opposing sides of said central spine,
and further wherein said attachment rail comprises a male track insert which is received into one of said opposed mounting channels in said female track whereby said PV panel is secured to said female track.

3. The mount system of claim 1 further comprising a plurality of fasteners which are received through the openings in said mounting rail and secured in the corresponding aligned one-piece standoff mounts, whereby said mounting rail is secured to said one-piece standoff mounts.

4. The mount system of claim 3 wherein said fasteners are a threaded bolt and cap nut, said cap nut being received in said one-piece standoff mount and said threaded bolt being received through said opening in said mounting rail and into said cap nut in said one-piece standoff mount.

5. The mount system of claim 1 further comprising a polymeric wind shield having a retaining tab portion and a shield portion extending outwardly and downwardly from said retaining tab portion.

6. The mount system of claim 1 wherein said mounting rail includes a polymeric wire management channel.

7. The mount system of claim 2 wherein said female track further includes a polymeric J-shaped wire management channel extending downwardly from an underside of one of said opposed mounting channels.

8. The mount system of claim 1 further comprising a plurality of elastomeric annular bonding rings having a diameter greater than a diameter of said base portion of said one-piece standoff mounts, said elastomeric bonding rings having a central opening which is received over said one-piece standoff mount, said elastomeric bonding rings being bonded to said substrate to secure said one-piece standoff mounts to said substrate.

9. The mount system of claim 1 wherein said substrate is an elastomeric membrane, said mount system further comprising a plurality of annular bonding rings formed from an elastomeric membrane material and having a diameter greater than said base portion of said one-piece standoff mounts, said elastomeric membrane bonding rings having a central opening which is received over said one-piece standoff mount, said elastomeric membrane bonding rings being bonded to said membrane to secure said one-piece standoff mounts to said membrane.

10. The mount system of claim 1 wherein said attachment rail further includes a separating shoulder extending upwardly between said inner land portion and said retaining tab portion.

11. A mount system for a photovoltaic panel comprising:
- a plurality of one-piece standoff mounts each having a base portion securable to a substrate in a linear array at a predetermined spacing, said plurality of standoff mounts comprising elastomeric materials and having neck portions extending upwardly from the base portion;
- a mounting rail having a central spine including at least one side edge and a plurality of openings arranged longitudinally along said central spine at a predetermined spacing matching said spacing of said one-piece standoff mounts, said mounting rail being supported on said neck portions of said plurality of one-piece standoff mounts above said substrate, said mounting rail being secured to said plurality of one-piece standoff mounts;
- an attachment rail having an inner land portion on which an edge portion of a PV panel is secured, said attachment rail having an outer retaining tab portion,
- said at least one side edge of said central spine of said mounting rail and said outer retaining tab portion of said attachment rail including interfitting locking formations that are removably received and secured together, whereby said PV panel is removably secured to said mounting rail,
- wherein said mounting rail comprises a female track having opposed outwardly facing mounting channels on opposing sides of said central spine, said female track including a wire management channel extending downwardly from an underside of one of said opposed mounting channels,
- wherein said fasteners comprise a threaded bolt and cap nut, said cap nut being received in said plurality of one-piece standoff mounts and said threaded bolt being received through said opening in said mounting rail and into said cap nut in said one-piece standoff mount,
- wherein said substrate comprises an elastomeric membrane, said mount system comprising a plurality of annular bonding rings formed from an elastomeric membrane material and having a diameter greater than a diameter of said base portion of said one-piece standoff mounts, said elastomeric membrane annular bonding rings having a central opening that is received over said neck portions of said plurality of one-piece standoff mounts, said elastomeric membrane annular bonding rings being bonded to said elastomeric membrane to secure said one-piece standoff mounts to said elastomeric membrane, and
- wherein said attachment rail comprises a male track insert having an outer retaining tab portion that is received into one of said opposed mounting channels in said female track whereby said PV panel is secured to said female track.

* * * * *